(12) United States Patent
Osaka et al.

(10) Patent No.: US 6,400,528 B1
(45) Date of Patent: *Jun. 4, 2002

(54) MAGNETIC HEAD

(75) Inventors: Tomohiko Osaka; Norikazu Kudo, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/488,804

(22) Filed: Jan. 21, 2000

(51) Int. Cl.$^7$ ................................. G11B 5/60
(52) U.S. Cl. ..................................... 360/234.2
(58) Field of Search ............................... 360/234.2, 237

(56) References Cited

U.S. PATENT DOCUMENTS

| | | |
|---|---|---|
| 4,420,780 A | 12/1983 | Deckert |
| 5,301,077 A | 4/1994 | Yamaguchi et al. |
| 6,115,219 A * | 9/2000 | Hall ........................ 360/234.2 |
| 6,243,232 B1 * | 6/2001 | Osaka et al. ............. 360/234.2 |

FOREIGN PATENT DOCUMENTS

| | | |
|---|---|---|
| EP | 0129336 | 12/1984 |
| EP | 0935240 A2 | 8/1999 |
| EP | 0935240 A3 | 8/1999 |
| EP | 0935240 | 11/1999 |
| JP | 06139540 | 5/1994 |
| JP | 9212818 | 8/1997 |

* cited by examiner

Primary Examiner—Robert S. Tupper
(74) Attorney, Agent, or Firm—Ladas & Parry

(57) ABSTRACT

A magnetic head is provided with first and second magnetic head units and a slider on which is formed a central groove that divides the slider into first and second air bearing surfaces and which generates an air flow between a rotating magnetic disk and the first and second air bearing surfaces. Further, the magnetic head is characterized in that a distance $Y_H$ from a center of a track of the first magnetic head unit to an edge of the first air bearing surface in a direction of travel of the recording medium, and a distance $X_H$ from a center of a track of the first magnetic head unit to an edge of the first air bearing surface in a direction perpendicular to the direction of travel of the recording medium, are such that 0.01 mm $\leq Y_H \leq$ 0.1 mm and 0.01 mm $\leq X_H$ 0.1 mm.

8 Claims, 9 Drawing Sheets

DIRECTION OF DISK APPROACH

MAGNETIC HEAD

BACKGROUND OF THE INVENTION

1. Field of the Invention

The present invention relates generally to a magnetic head, and more particularly, to a magnetic head for recording and reproducing data in a state in which the magnetic head floats over a rotating recording medium, that is, a rotating magnetic disk, due to an air flow arising between the magnetic head and the magnetic disk.

2. Description of the Related Art

Generally, an ordinary magnetic disk drive that uses a flexible magnetic disk having a coercive force of 900 oersted (Oe) or less as a magnetic recording medium allows a relatively low rotational speed of for example 300 rpm. In this case, magnetic recording and reproduction is performed by causing the magnetic head to be in direct sliding contact with the magnetic disk.

However, with recent advances in high-density recording on magnetic disks, the rotation speed of the magnetic disk has been increased to for example 3000 rpm, with the coercive force of the magnetic disk being increased to 1500 Oe or more. As a result, in order to accommodate such so-called high-capacity magnetic disks a magnetic disk drive has appeared in which the magnetic head is provided with a narrow gap. Hereinafter such a magnetic disk drive will be referred to as a high-capacity magnetic disk drive.

Since a high-capacity magnetic disk drive allows the magnetic disk to be rotated at high speeds, the magnetic disk and the magnetic head used therein may be easily damaged if the magnetic head were to be caused to be in direct contact with the magnetic disk, as is done in the conventional magnetic disk drive.

As a result, the high-capacity magnetic disk drive is designed so that the magnetic head floats in an elevated state over the surface of the high-capacity magnetic disk due to an elevating force arising as a result of an air flow caused by a relative speed between a slider surface of the magnetic head and the magnetic disk. Magnetic recording and reproduction is performed while a state of non-contact between the magnetic head and the magnetic disk is maintained.

FIGS. 1, 2, 3, 4 and 5 show a magnetic head used in the conventional high-capacity magnetic disk drive.

As shown in FIGS. 1 and 2, the conventional high-capacity magnetic head 1 generally comprises a slider 2 and a magnetic head unit 3. The slider 2 supports the magnetic head unit 3 and causes the magnetic head unit 3 to float over the magnetic disk 6.

The top surface of the slider 2 forms an air bearing surface for forming an air bearing with respect to the magnetic disk 6. Additionally, a central groove 2a is formed at a central position of the top surface of the slider 2. As shown in FIG. 1, the central groove 2a divides the air bearing surface into a first air bearing surface 2b located to the right side of the central groove 2a and a second air bearing surface 5 located to the left side.

The magnetic head unit 3 and a pair of grooves or slots 4 are provided at the first air bearing surface 2b. The magnetic head unit 3 for performing magnetic recording and reproducing is formed by sandwiching a gap member between thin plates of magnetic cores.

The slots 4 extend in a tangential direction of the magnetic disk 6, that is, in the direction of arrow X in FIG. 1, and provide a vent for an air flow produced between the magnetic disk 6 and the first air bearing surface 2b. By providing a vent to the air flow produced between the magnetic disk 6 and the first air bearing surface 2b, an elevating force exerted on the magnetic head 1 is reduced. Accordingly, by providing the slots 4, the elevating force of the magnetic head 1 can be controlled.

As described above, the second air bearing surface 5 is formed to the left of the central groove 2a located on the top surface of the slider 2 as shown in FIG. 2. Like the first air bearing surface 2b, the second air bearing surface 5 also produces a force for elevating the magnetic head 1.

FIG. 3 is a lateral cross-sectional view from a radial direction of disk approach. As shown in the drawing, a pair of magnetic heads are supported so as to be opposite each other within the magnetic disk drive. The elevating force generated by the second air bearing surface 5 described above exerts a force that pushes the magnetic disk 6 in the direction of the first air bearing surface 2b, that is, in the direction of the magnetic head unit 3, of the opposite magnetic head 1. Accordingly, the second air bearing surface 5 also functions as a pressure pad for pressing the magnetic disk 6 toward the opposite magnetic head 1.

Additionally, as described above slots 4 are formed in the first air bearing surface 2b. The slots 4 provide a vent for the air flow produced between the magnetic disk 6 and the fist air bearing surface 2b, thus reducing the elevating force exerted on the magnetic head 1. Accordingly, the magnetic disk 6 is deformed by a negative pressure generated in the slots 4 and a pressure generated at the second air bearing surface 5 due to a change in air flow so as to warp toward a gap 3a as the magnetic disk 6 rotates between the pair of magnetic heads 1. With this construction, optimum recording to and reproduction from the magnetic disk 6 is ensured even with floating magnetic heads 1.

A description will now be given of how the magnetic heads 1 face the magnetic disk 6, with reference to FIG. 4 and FIG. 5. FIGS. 4 and 5 show views of a state in which the magnetic head 1 is recording to or reproducing from a magnetic disk 6, from a radial Y direction of the magnetic disk 6.

FIG. 4 shows the magnetic disk 6 in a state of optimal approach to the magnetic head 1.

As shown in FIG. 4, a pair of slots 4 are formed in the first air bearing surface 2b in which the first magnetic head unit 3 is provided. These slots 4 are formed along an entire length of the first air bearing surface, that is, from a leading edge 7 of the magnetic head 1, that is, an edge side of the magnetic head 1 at which the magnetic disk 6 enters the magnetic head 1, to a trailing edge 8 of the magnetic head 1, that is, an edge side of the magnetic head 1 at which the magnetic disk 6 exits the magnetic head 1. As a result, a reduction in the elevating force due to the presence of the slots 4 is generated over the entire extent of the length of the first air bearing surface 2b.

Accordingly, even in a state of optimal approach a distance H between the magnetic disk 6 and the leading edge 7 of the magnetic head 1 in the above-described construction in which the slots 4 are provided is smaller than a corresponding distance in a construction in which the slots 4 are not provided.

Moreover, with such a construction the magnetic disk 6 is maintained in close proximity to the magnetic head unit 3 as a result of the reduction in elevating force by the slots 4, thus providing optimal magnetic recording and reproduction.

By contrast, FIG. 5 shows a state in which the magnetic disk 6 approaches the magnetic head 1 at a height position lower than that of an optimal approach. Such a smallclearance state of approach results from the flexibility of the magnetic disk 6 or from inevitable errors in the production process thereof. This phenomenon is called penetration.

When the height of the magnetic disk 6 upon approach to the magnetic head 1 is lower than a standard optimum height position as described above, the distance H is reduced to such an extent that the magnetic disk 6 may come into contact with the leading edge 7 of the magnetic head 1, and the magnetic disk 6 or the leading edge 7 of the magnetic head 1 may be damaged as a result.

Additionally, if a structure is used in which no slots 4 are provided in an effort to prevent damage to the magnetic disk 6 due to this penetration, the magnetic disk 6 and the magnetic head unit 3 become separated and it becomes impossible to obtain optimal magnetic recording and reproduction.

SUMMARY OF THE INVENTION

Accordingly, it is a general object of the present invention to provide an improved and useful magnetic head in which the disadvantages described above are eliminated. A more specific object of the present invention is to provide a magnetic head capable of preventing damage to the recording medium (magnetic disk) while maintaining a state of optimum magnetic recording and reproduction.

The above-described objects of the present invention are achieved by a magnetic head comprising:

a first magnetic head unit for recording to and reproducing from a first flexible rotating recording medium;

a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;

an elevating force control slot formed on at least the first air bearing surface so as to extend in a direction substantially perpendicular to the direction from which the first or second flexible rotating recording medium approaches the magnetic head; and an incision formed on a trailing edge side of the slider so as to restrict a width of the first air bearing surface and at the same time penetrate in a direction of the height of the slider, a distance from a center position of a track of the first magnetic head unit to an edge of the first air bearing surface in the direction from which the first or second flexible rotating recording medium approaches the magnetic head being $Y_H$, a distance from a center position of a track of the first magnetic head unit to an edge of the first air bearing surface perpendicular to the direction from which the first or second flexible rotating recording medium approaches the magnetic head being $X_H$, such that $0.01 \text{ mm} \leq Y_H < 0.1 \text{ mm}$ and $0.01 \text{ mm} \leq X_H < 0.1 \text{ mm}$.

According to the invention described above, the first magnetic head unit can be positioned at a lowest elevation range of the recording medium because the first magnetic head unit and the edge of the first air bearing surface can be positioned near each other. In so doing, it is possible to obtain stable electromagnetic conversion characteristics and at the same time prevent contact between the recording medium and the magnetic head because an ideal floating condition, that is, so-called zero penetration, can be achieved.

Additionally, the above-described objects of the present invention are also achieved by a magnetic head comprising:

a first magnetic head unit for recording to and reproducing from a first flexible rotating recording medium;

a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;

an elevating force control slot formed on at least the first air bearing surface so as to extend in a direction substantially perpendicular to the direction from which the first or second flexible rotating recording medium approaches the magnetic head; and an incision formed on a trailing edge side of the slider so as to restrict a width of the first air bearing surface and at the same time penetrate in a direction of the height of the slider, a slanting surface formed on a leading edge side of the first and second air bearing surfaces, respectively, a chamfered portion being formed on an outer periphery of a flat surface portion forming the first and second air bearing surfaces as well as on an outer periphery of a flat surface portion forming the slanting surface.

According to the inventions described above, damage to the recording medium can be reduced.

That is, by forming a curved chamfered portion on an outer periphery of each of the flat surfaces, even when using a recording medium having a tolerance of a penetration of for example approximately ±0.2 and this recording medium contacts the magnetic head, because the peripheral portion of each of the flat surfaces that comprise the contact positions has a curved chamfered portion, the surface area of the contact with the recording medium increases and hence the contact load can be dispersed. Accordingly, even if the recording medium contacts the magnetic head, the load per unit of surface area applied to the recording medium is decreased and thus any damage to the recording medium can be reduced.

Additionally, the above-described object of the present invention is also achieved by the magnetic head as described above, wherein of the four corner portions of the flat surfaces forming the first and second air bearing surfaces of the slider at least the two corner portions on the leading edge of the slider have an arc shape of which a radius R is greater than or equal to 0.2 mm but less than or equal to 1 mm.

According to the invention described above, the contact load on a leading edge that is a position at which the recording medium approaches the magnetic head can be dispersed. As a result, even if the leading edge of the magnetic head contacts the recording medium, the load per unit of surface area applied to the recording medium is decreased and thus any damage to the recording medium can be reduced.

Additionally, even if the recording medium contacts the trailing edge, for the same reasons described above damage to the recording medium can be reduced and the recording medium can be more reliably protected.

Additionally, the above-described objects of the present invention is also achieved by the magnetic head as claimed in claim 1, wherein the chamfered is configured so that at least three interference fringes/patterns can be recognized using an optical flat, a pitch S of the interference fringes being such that 10 $\mu$m$\leq$S$\leq$50 $\mu$m.

According to the invention described above, it is possible to more effectively reduce damage to the above-described recording medium.

Additionally, the above-described object of the present invention is also achieved by a magnetic head comprising:
- a first magnetic head unit for recording to and reproducing from a first flexible rotating recording medium;
- a second magnetic head unit for recording to and reproducing from a second flexible rotating recording medium having a coercive force lower than a coercive force of the first flexible rotating recording medium;
- a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;
- an elevating force control slot formed on at least the first air bearing surface so as to extend in a direction substantially perpendicular to the direction from which the first or second flexible rotating recording medium approaches the magnetic head; and
- a first incision formed on a trailing edge side of the slider so as to restrict a width of the first air bearing surface and at the same time penetrate in a direction of the height of the slider,
  - a slanting surface formed on a leading edge of the first and second air bearing surfaces, respectively, a border portion between the slanting surface and the first and second air bearing surfaces forming a continuous curve.

According to the invention described above, it is possible to more effectively reduce damage to the above-described recording medium.

That is, when there is penetration, the position at which the biggest load is most easily applied to the recording medium is the inner sliding side angle of the leading edge toward which the recording medium approaches. This inner sliding side angle corresponds to a position contacting the first and second air bearing surfaces and the slanting surface. This position is the most easily damaged insofar as it is the most easily contacted between the recording medium and the magnetic head.

However, because the border portion between the slanting surface and the first and second air bearing surfaces forms a continuous curve, the surface area of the contact with the recording medium becomes large and hence the contact load can be dispersed. Accordingly, even if the recording medium contacts the magnetic head, the load per unit of surface area applied to the recording medium is decreased and thus any damage to the recording medium can be reduced.

Additionally, the above-described object of the present invention is also achieved by the magnetic head as described above, wherein:
- a second incision is formed on a trailing edge of the slider, the trailing edge of the slider being an outer side of the first magnetic head unit; and
- a leading edge side of the first air bearing surface having a width A1, a portion near to the first magnetic head unit formed by the second incision having a width A2 smaller than the width A1, a portion distant from the first magnetic head unit not formed by the second incision having a width A3 larger than the width A2 but smaller than the width A1, such that A2$\leq$A3$\leq$A1.

According to the invention described above, the air flow generated between the recording medium and the slider is vented by the second incision, thereby reducing the elevating force in the vicinity of the second incision.

Additionally, the first magnetic head unit can be positioned at a lowest elevation range. In so doing, it is possible to obtain stable electromagnetic conversion characteristics and at the same time prevent contact between the recording medium and the magnetic head because an ideal floating condition, that is, so-called zero penetration, can be achieved.

Additionally, the above-described object of the present invention is also achieved by a magnetic head comprising:
- at least one magnetic head unit for recording to and reproducing from a flexible rotating recording medium;
- a slider supporting the magnetic head unit, the slider having a central groove separating a first air bearing surface and a second air bearing surface, the slider generating an elevating force from an air flow generated in a space between the first and second air bearing surfaces and the flexible rotating recording media;
- an elevating force control slot formed on at least one of either the first or second air bearing surfaces so as to extend in a direction substantially perpendicular to the direction from which the first or second flexible rotating recording medium approaches the magnetic head; and
- an incision formed on a trailing edge side of the slider so as to restrict a width of the air bearing surfaces and at the same time penetrate in a direction of the height of the slider,
  - a distance from a center position of a track of the magnetic head unit to an edge of the air bearing surfaces in the direction from which the flexible rotating recording medium approaches the magnetic head being $Y_H$, a distance from a center position of a track of the magnetic head unit to an edge of the air bearing surfaces perpendicular to the direction from which the flexible rotating recording medium approaches the magnetic head being $X_H$, such that 0.01 mm$\leq Y_H \leq$0.1 mm and 0.01 mm$\leq X_H \leq$0.1 mm.

According to the invention described above, the magnetic head unit and the edge of the air bearing surface come into close proximity to each other, so the magnetic head unit can be positioned at a lowest elevation range of the recording medium. In so doing, it is possible to obtain stable electromagnetic conversion characteristics and at the same time prevent contact between the recording medium and the magnetic head because an ideal floating condition, that is, so-called zero penetration, can be achieved.

Other objects, features and advantages of the present invention will become more apparent from the following detailed description when read in conjunction with the accompanying drawings.

DESCRIPTION OF THE PREFERRED EMBODIMENTS

First, a description will be given of a first embodiment of the present invention, with reference to the accompanying drawings.

Figure 1:
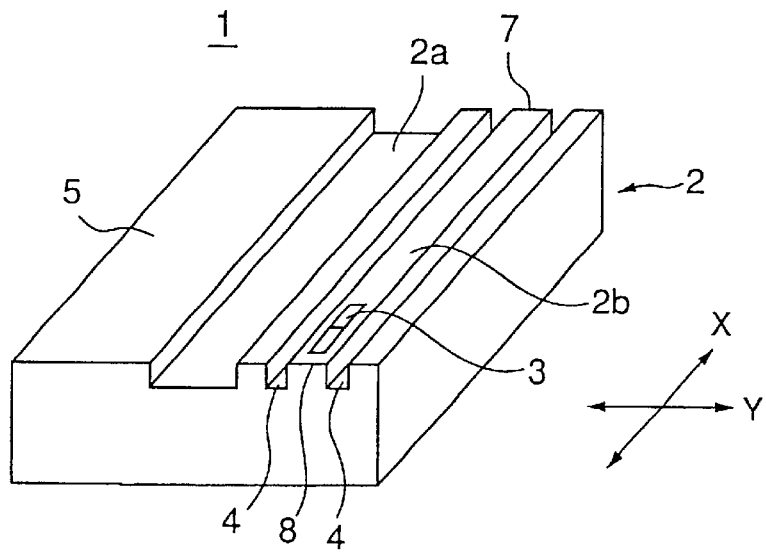
FIG. 1 is a perspective view of a conventional magnetic head for explaining the problems thereof.
Figure 2:
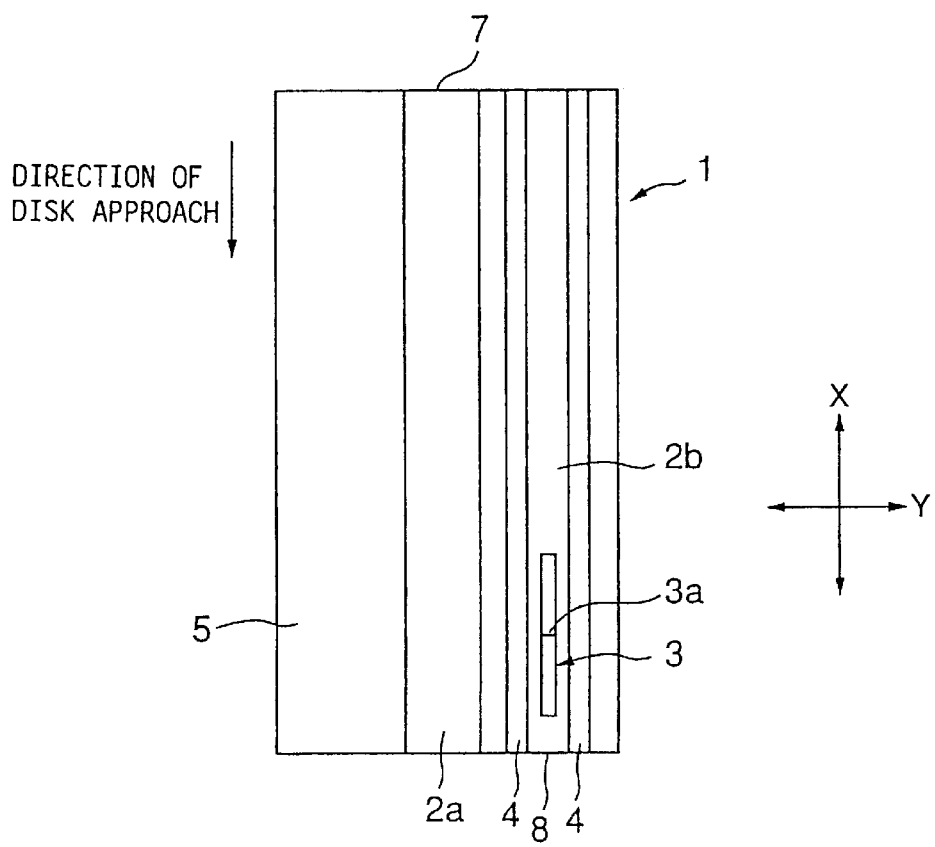
FIG. 2 is a plan view of the conventional magnetic head.
Figure 3:
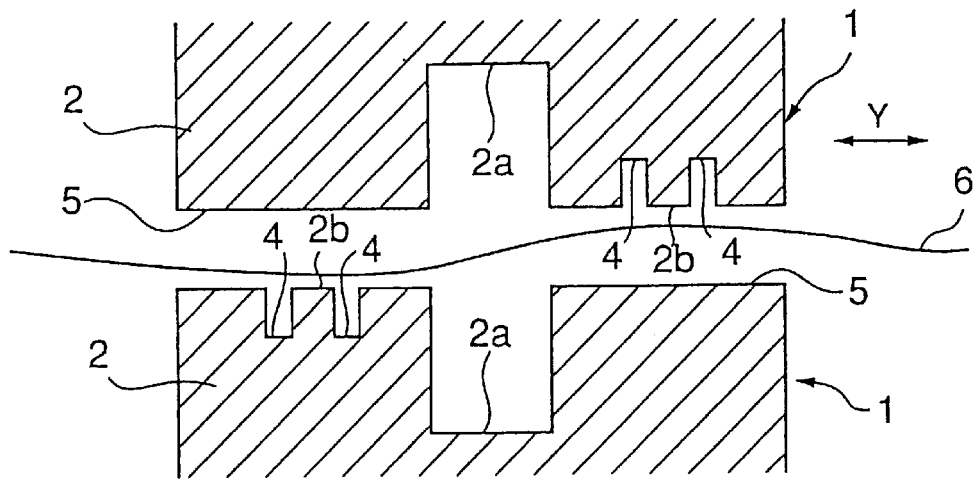
FIG. 3 is a lateral cross-sectional view of the conventional magnetic head from a direction of approach of a disk.
Figure 4:
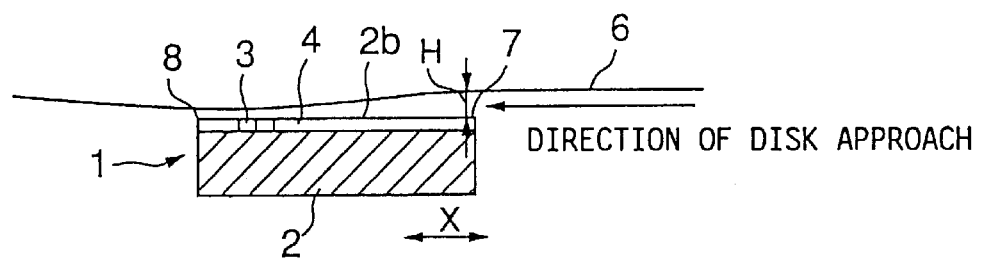
FIG. 4 is a lateral cross-sectional view of the conventional magnetic head from a radial Y direction of a disk for explaining a state of approach of the disk.
Figure 5:
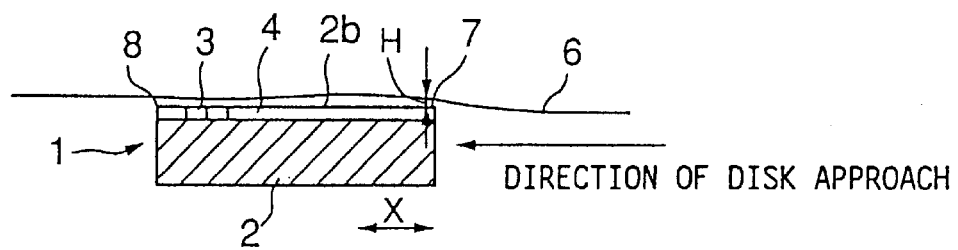
FIG. 5 is a lateral cross-sectional view of the conventional magnetic head for explaining a state in which a height of approach of a disk is lower than a standard optimum height.
Figure 6:
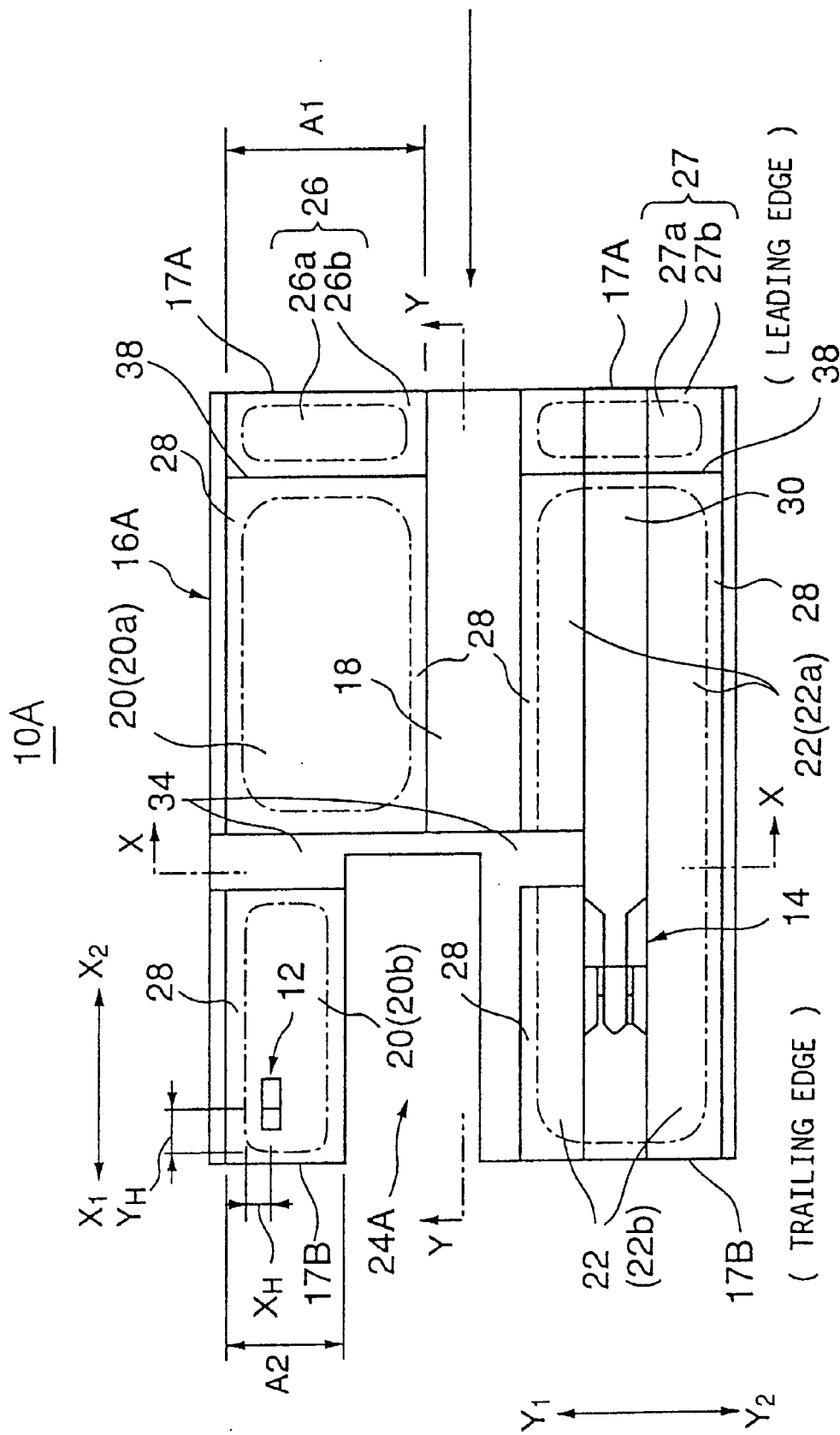
FIG. 6 is a plan view of a first embodiment of a magnetic head according to the present invention.
Figure 7:
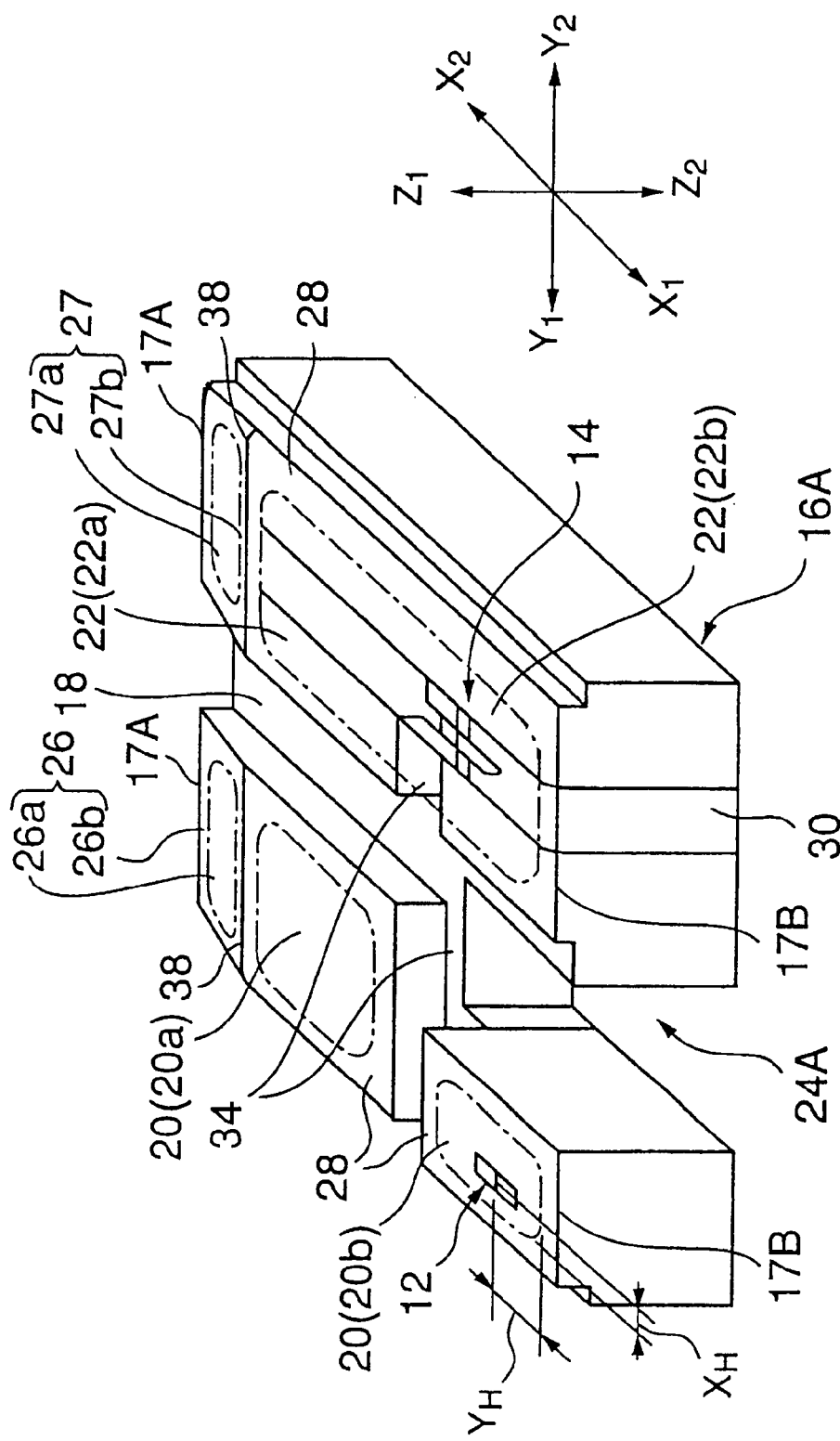
FIG. 7 is a perspective view of a first embodiment of the magnetic head according to the present invention.
Figure 8:
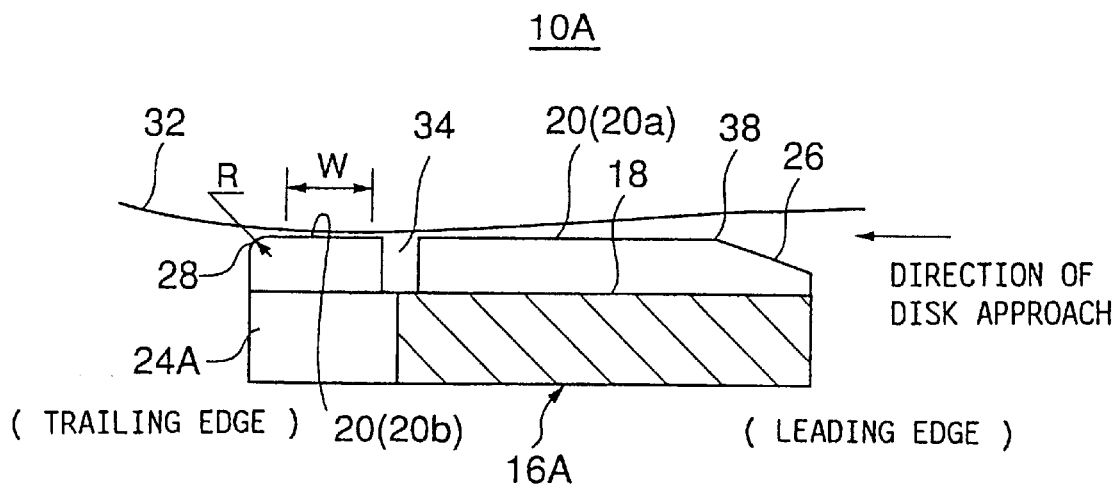
FIG. 8 is a cross-sectional view of the magnetic head shown in FIG. 6 along a line Y—Y therein.
Figure 9:
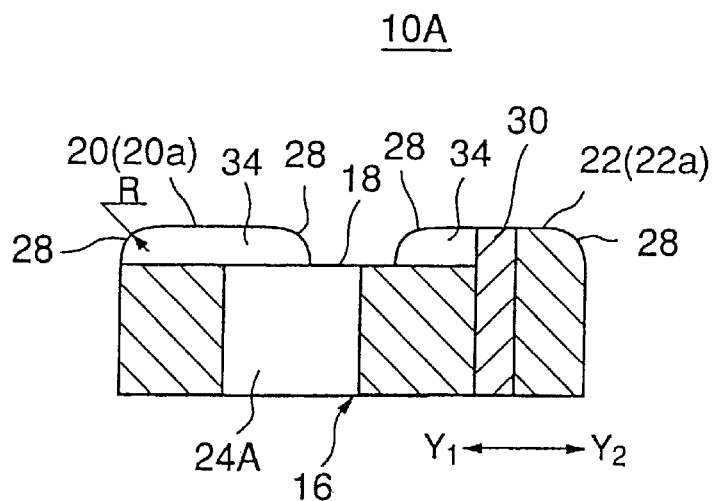
FIG. 9 is a cross-sectional view of the magnetic head shown in FIG. 7 along a line X—X therein.
Figure 10:
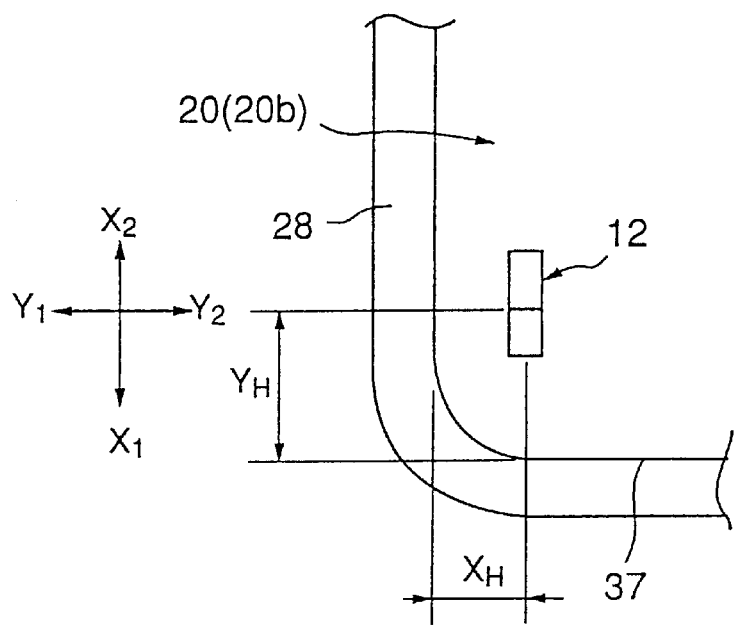
FIG. 10 is an enlarged view of a vicinity of a first magnetic head unit of a first embodiment of the magnetic head according to the present invention.

FIGS. 6, 7, 8, 9 and 10 show a first embodiment of a magnetic head 10A according to the present invention. FIG. 6 is a plan view of a first embodiment of a magnetic head according to the present invention. FIG. 7 is a perspective view of a first embodiment of the magnetic head according to the present invention. FIG. 8 is a cross-sectional view of the magnetic head shown in FIG. 6 along a line Y—Y therein. FIG. 9 is a cross-sectional view of the magnetic head shown in FIG. 7 along a line X—X therein. FIG. 10 is an enlarged view of a vicinity of a first magnetic head unit of a first embodiment of the magnetic head according to the present invention, to be explained later.

The magnetic head 10A generally comprises a first magnetic head unit 12, a second magnetic head unit 14 and a slider 16A. The first and second magnetic head units 12, 14 are provided on air bearing surfaces 20, 22 formed on the slider 16A. Of the pair of magnetic head units 12, 14, the first magnetic head unit 12 is a high-capacity magnetic head for magnetic recording and reproduction, and is adapted for magnetic disks, or recording media, having a coercive force of 1500 Oe or more. The second magnetic head unit 14 is a magnetic head for ordinary magnetic recording and reproduction, and is adapted, for example, for magnetic disks having a coercive force of approximately 600–700 Oe. The second magnetic head unit 14 is constructed so that a read/write gap (R/W gap) and an erase gap (E gap) are formed by sandwiching a gap member between magnetic head cores 30. In other words, the magnetic head 10A according to this first embodiment of the present invention has a so-called compatible-type magnetic head structure, capable of performing both ordinary magnetic recording and reproduction as well as high-capacity magnetic recording and reproduction.

The slider 16A is a block member formed, for example, of a ceramic. The slider 16A supports the first and second magnetic head units 12, 14 and also provides a force for elevating the first and second magnetic head units 12, 14 so that the first and second magnetic head units 12, 14 float over a magnetic disk 32. Additionally, the slider 16A is provided with a central groove 18, a first air bearing surface 20, a second air bearing surface 22, an incision 24A, a first slanting surface 26, a second slanting surface 27, a chamfered part 28 and an elevating force control slot 34.

The central groove 18 is formed at a position in a center of a width of a top surface of the slider 16A, that is, in a direction indicated by arrows Y1-Y2 in the drawing, so as to extend longitudinally in a direction of travel of the magnetic disk 32, that is, in a direction indicated by the arrows X1-X2 in the drawing. By forming the central groove 18, the first and second air bearing surfaces 20 and 22, respectively, are formed so as to sandwich the central groove of the slider 16A.

In order for the magnetic head 10A to float properly over the magnetic disk 32, the air flow generated between the slider 16A and the magnetic disk 32 must be smooth. It is for this purpose that the first and second air bearing surfaces 20, 22 are formed as highly flat surfaces. These highly flat surfaces are those portions that are enclosed by the dotted chain lines shown in the drawings.

Additionally, the first and second slanting surfaces 26, 27 extending across a predetermined range are formed on the leading edges of the first and second air bearing surfaces, that is, the X2 side, from which the magnetic disk 32 approaches.

The slanting surfaces 26, 27 comprise flat surface portions 26a, 27a (shown in the drawings as those portions enclosed by the dotted chain lines) and chamfered portions 26b, 27b formed on the outer periphery of the flat surface portions 26a, 27a. Additionally, the flat surface portions 26a, 27a form an angle of for example 60 minutes or less with respect to the first and second air bearing surfaces 20, 22. By forming the slanting surfaces 26, 27 on the leading edges of the first and second air bearing surfaces, a hard collision between the magnetic disk 32 and the slider 16A can be prevented.

It should be noted that, in the following description, the X2 edge of the slider 16A facing the magnetic disk 32 as it approaches is referred to as a leading edge 17A. Additionally, the X1 edge of the slider 16A facing the magnetic disk 32 as it withdraws is referred to as a trailing edge 17B.

Next, an explanation will be given of the chamfered part 28. The chamfered part 28 is formed so as to enclose the first and second air bearing surfaces 20, 22 on a peripheral portion thereof. In the present embodiment, the chamfered part 28 is shaped in the form of a curve surface so that an edge is not formed at the border portion between the chamfered part 28 and the first and second air bearing surfaces 20, 22. More specifically, as shown in FIGS. 8 and 9, the chamfered part 28 is curved in the shape of an arc having a radius R.

Additionally, as described above, chamfered portions 26b, 27b for the slanting surfaces are formed around the periphery of the flat surface portions 26a, 27a that form the first and second slanting surfaces 26, 27. Like the chamfered part 28, the chamfered portions 26b, 27b for the slanting surfaces are curved in the shape of an arc having a radius R.

Providing the chamfered part 28 and the chamfered portions 26b, 27b for the slanting surfaces also prevents damage to the magnetic disk 32, for reasons explained below.

The magnetic disk 32 is a flexible disk, so inevitably vibration rotation occurs when the disk rotates, which produces a change in the flow of air passing between the slider 16A and the magnetic disk 32. The slider 16A, that is, the magnetic head 10A, does follow this change in air volume and displace, but when this change is large the slider 16A cannot follow it and hence the magnetic disk 32 may contact the slider 16A.

In this case, the position at which the magnetic disk 32 might contact the slider 16A is an outer peripheral position of the first and second air bearing surfaces 20, 22 as well as first and second slanting surfaces 26, 27 positioned at the leading edge of the magnetic head toward which the magnetic disk 32 approaches.

Accordingly, by forming a curved chamfered portion on an outer periphery of each of the flat surfaces, even when using a recording medium having a tolerance of a penetration of for example approximately ±0.2 and this recording medium contacts the magnetic head, because the peripheral portion of each of the flat surfaces that comprise the contact positions has a curved chamfered portion, the surface area of the contact with the recording medium becomes large and hence the contact load can be dispersed. Accordingly, even if the recording medium contacts the magnetic head, the load per unit of surface area applied to the recording medium is decreased and thus any damage to the recording medium can be reduced.

Next, a description will be given of the first incision 24A.

The first incision 24A is formed on an X1 side edge, that is, a trailing edge, of the central groove 18. The first incision 24A is formed so as to penetrate the slider 16A in a direction of a thickness of the slider 16A, that is, in a direction indicated by the Z1-Z2 arrows.

By varying a width dimension of the first incision 24A in a Y1-Y2 direction, it is possible to control a width dimension of the trailing edge 17B of the first air bearing surface 20. In the present embodiment, by forming the first incision 24A, a width A2 of the trailing edge 17B of the first air bearing surface 20 is made smaller than a width A1 of the leading edge 17A of the first air bearing surface 20.

As a result, by providing the first incision 24A such that A1 is greater than A2, the elevating force of the air flow at the trailing edge is smaller than that at the leading edge. Accordingly, it is possible to prevent contact between the leading edge 17A and the magnetic disk 32 and at the same time bring the magnetic disk 32 into close proximity to the first magnetic head unit 12.

Next, a description will be given of the elevating force control slot 34.

The elevating force control slot 34 is formed so as to cut across the first and second air bearing surfaces 20, 22, and more specifically, formed so as to extend in a direction perpendicular to the direction of travel of the magnetic disk 32, that is, in a direction indicated by the Y1-Y2 arrow.

The elevating force control slot 34 is a groove formed with a bottom, formed so as to extend from a side portion of a magnetic head core 30 toward the first air bearing surface 20. Additionally, an edge of the first incision 24A, and more specifically, an edge in the X2 direction, is configured so as to be positioned within a region of formation of the elevating force control slot 34.

Forming the elevating force control slot 34 divides the first air bearing surface 20 into a first leading surface 20a and a first trailing surface 20b.

Similarly, forming the elevating force control slot 34 likewise divides the second air bearing surface 22 into a second leading surface 22a and a second trailing surface 22b.

By providing the elevating force control slot 34 having the above-described configuration the elevating force is reduced, because the flow of air between the air bearing surfaces 20, 22 and the magnetic disk 32 at a position at which the elevating force control slot 34 is formed is vented via the elevating force control slot 34.

In particular, in the present embodiment, the edge of the first incision 24A is positioned within a region of formation of the elevating force control slot 34, thus forming a pathway through which the flow of air is vented from the elevating force control slot 34 through the first incision 24A to a rear of the slider 16A. As a result, at the first and second air bearing surfaces 20, 22, the elevating force at and in the vicinity of the first incision 24A and the elevating force control slot 34 declines. Accordingly, the magnetic disk 32 and the first magnetic head unit 12 can be reliably brought into close proximity to each other to enable optimum magnetic tape recording and reproduction.

A description will now be given of the formation position of the first magnetic head unit 12 of the magnetic head 10A having the construction described above.

As shown in enlarged fashion in FIG. 10, the distinctive feature of the present embodiment is that the first magnetic head unit 12 is positioned near an edge portion 37 of the first air bearing surface 20, that is, at a border position between the first air bearing surface 20 and the chamfered part 28.

More specifically, a distance from a central position of a track of the first magnetic head unit 12 to an edge of the first air bearing surface 20 in a direction of travel of the recording medium indicated in FIG. 10 by arrow $Y_H$ is set so as to satisfy the condition 0.01 mm $\leq Y_H \leq$ 0.1 mm. Further, a distance from a central position of a track of the first magnetic head unit 12 to an edge of the first air bearing surface 20 in a direction perpendicular to the direction of travel of the recording medium indicated in FIG. 10 by arrow $X_H$ is set so as to satisfy the condition 0.01 mm $\leq X_H \leq$ 0.1 mm.

By positioning the first magnetic head unit 12 near the edge 37 of the first air bearing surface 20 as described above, the first magnetic head unit 12 can be positioned at the lowest elevation range of the magnetic disk 32 indicated by arrow W in for example FIG. 8, for reasons which are explained below.

That is, within the first air bearing surface 20, and in particular, the first trailing surface 20b formed by the first magnetic head unit 12, the flow of air is not uniform and thus the elevating force that elevates the magnetic disk 32 is unevenly distributed within the first air bearing surface 20.

More specifically, the air flow generated by the rotation of the magnetic disk 32 flows to the outside of the slider 16A via the central groove 18 and the elevating force control slot 34. Further, air flows from the outer peripheries of the first and second air bearing surfaces 20, 22, so the elevating force decreases at the positions at which the flow of air flows.

Accordingly, by positioning the first magnetic head unit 12 in the vicinity of the edge 37 of the first air bearing surface 20, that is, the position at which the flow of air flows, the first magnetic head unit 12 is positioned within the lowest elevation range of the magnetic disk 32. In so doing, it is possible to obtain stable electromagnetic conversion characteristics and at the same time prevent contact between the recording medium and the magnetic head because an ideal floating condition, that is, so-called zero penetration, can be achieved, thereby reliably preventing damage to the magnetic disk 32.

Next, a description will be given of a second embodiment of the present invention, with reference to FIG. 11.

Figure 11:
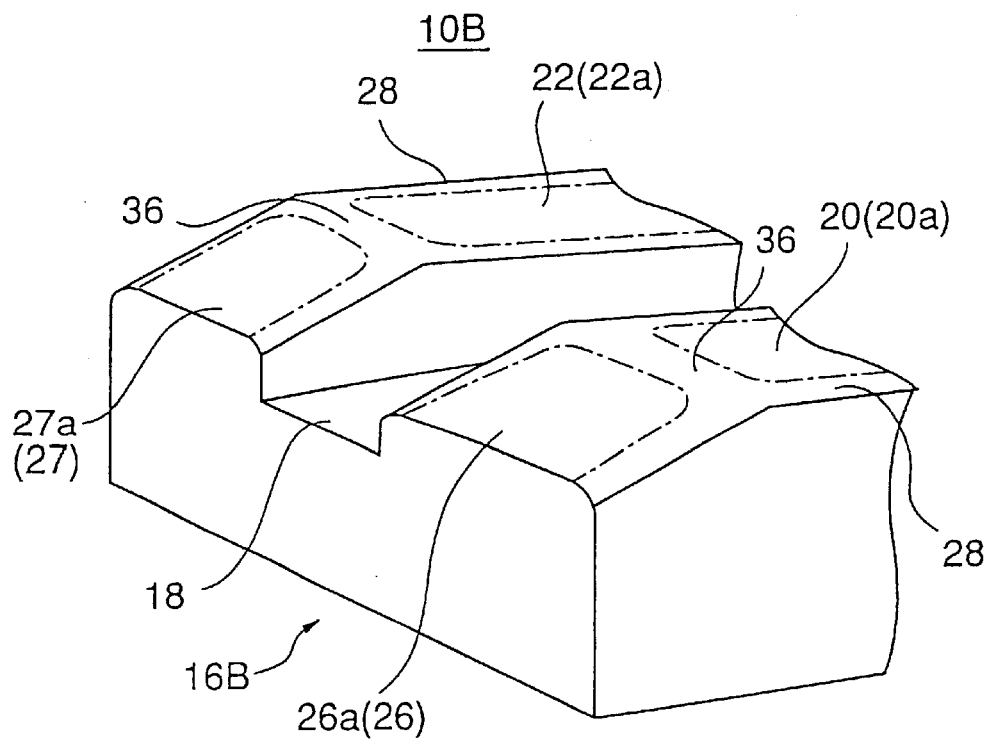
FIG. 11 is a cross-sectional view of an essential part of a second embodiment of the magnetic head according to the present invention.

FIG. 11 is a cross-sectional view of an essential part of a second embodiment of a magnetic head 10B according to the present invention. It should be noted that in FIG. 11 those parts identical to the corresponding parts of the magnetic head 10A of the first embodiment shown in FIGS. 6, 7, 8, 9 and 10 are given identical reference numerals and a description thereof omitted. Additionally, the distinctive feature of the second embodiment of the magnetic head 10B is in the construction of the leading edge of the magnetic head 10B, so FIG. 11 shows an enlarged view of only a central part.

The second embodiment of the magnetic head 10B according to the present invention, like the first embodiment, has first and second slanting surfaces 26, 27 formed on the leading edges of the first and second air bearing surfaces 20, 22.

In the above-described first embodiment, an edge 38 is formed at the border portion between the first and second slanting surfaces 26, 27 and the first and second air bearing surfaces 20, 22, as shown for example in FIG. 8.

By contrast, the second embodiment of the magnetic head 10B according to the present invention is characterized by the border between the first and second air bearing surfaces 20, 22 and the first and second slanting surfaces 26, 27 being formed in the shape of a continuously curved portion 36. By forming the continuously curved portion 36 as described, damage to the magnetic disk 32 can be reduced even if penetration occurs at the magnetic disk 32.

In other words, when there is penetration, the position at which the biggest load is most easily applied to the magnetic disk 32 is the inner sliding side angle of the leading edge toward which the magnetic disk 32 approaches. This inner sliding side angle corresponds to a position at which the first and second air bearing surfaces 20, 22 and the slanting surfaces 26, 27 contact each other. This position is the most easily damaged insofar as it is the most easily contacted between the magnetic disk 32 and the slider 16A.

However, because the border portion between the slanting surface and the first and second air bearing surfaces forms a continuous curve, the surface area of the contact with the recording medium becomes large and hence the contact load can be dispersed. Accordingly, even if the recording medium contacts the magnetic head, the load per unit of surface area applied to the recording medium is decreased and thus any damage to the recording medium can be reduced.

Next, a description will be given of a third embodiment of the magnetic head according to the present invention, with reference to FIG. 12.

Figure 12:
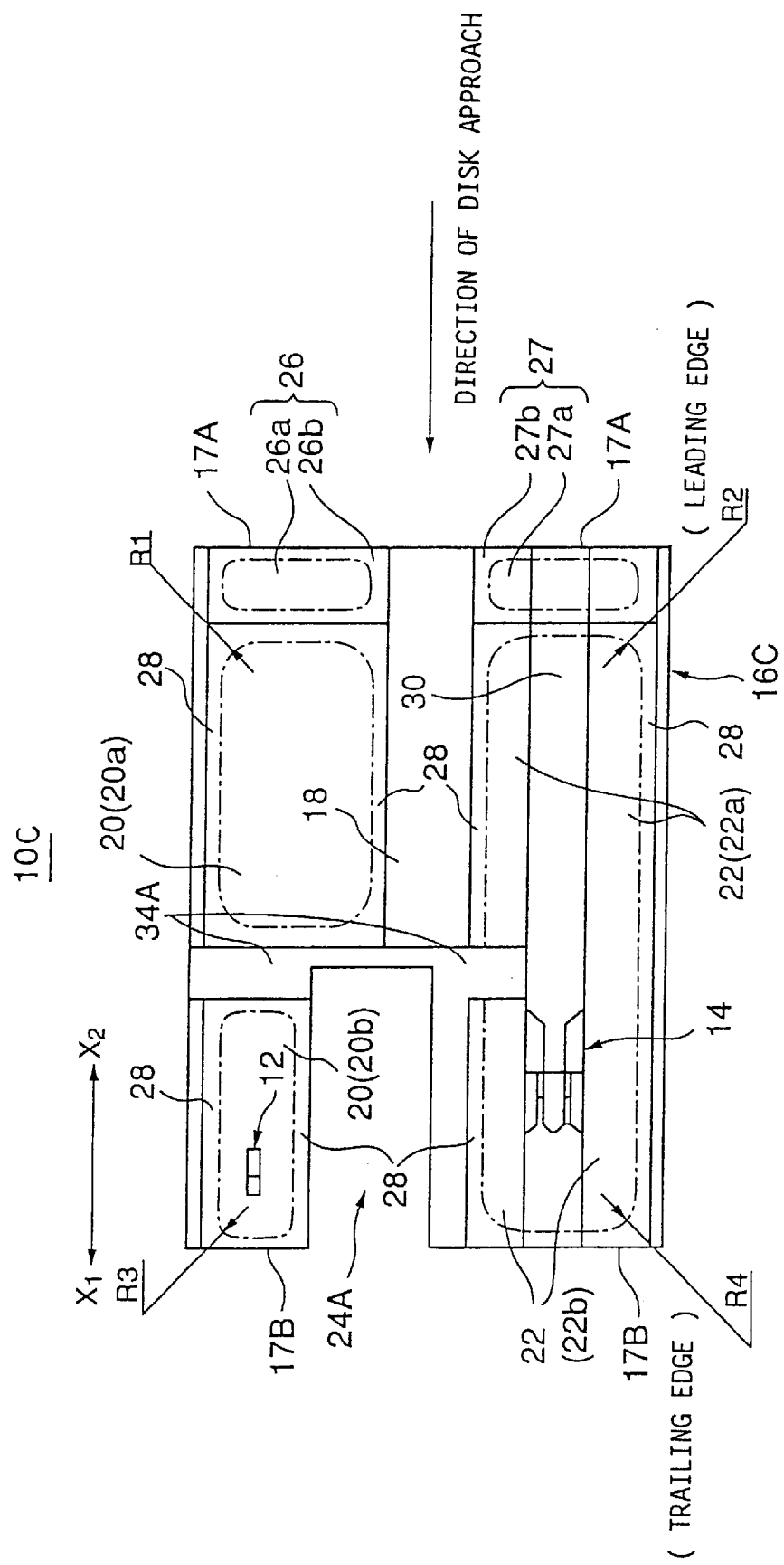
FIG. 12 is a plan view of a third embodiment of magnetic head according to the present invention.

FIG. 12 is a plan view of a third embodiment of a magnetic head 10C according to the present invention. In FIG. 12, those parts identical to the corresponding parts of the magnetic head 10A of the first embodiment shown in FIGS. 6, 7, 8, 9 and 10 are given identical reference numerals and a description thereof omitted.

In the magnetic head 10C according to the third embodiment, the part of the edges of the flat surface portions that form the first and second air bearing surfaces 20, 22 (enclosed by the dotted chain lines shown in the drawings) located at the corners of the slider 16C are formed in the shape of an arc, a radius R of such arc indicated by arrows R1 through R4 in the drawing and set so that $0.2 \text{ mm} \leq R \leq 1$ mm. The individual radii R1 through R4 formed at each of the four corners of the slider 16C may be set to any value so long as the individual radii R1 through R4 are 0.2 mm or more but 1 mm or less.

By forming the corners of the slider 16C to an arc of a predetermined radius, it is possible to disperse the load applied to the magnetic disk 32 even when the magnetic disk 32 and the slider 16C collide. Accordingly, even if the magnetic disk 32 collides with the slider 16C, that is, the magnetic head 10C, the load per unit of surface area applied to the magnetic disk 32 is decreased and thus any damage to the magnetic disk 32 can be reduced.

Further, the arc-shaped chamfered part 28 that contacts both the first and second air bearing surfaces 20, 22 is configured so that a pitch S of interference fringes recognized using an optical flat is $10 \ \mu\text{m} \leq S \leq 50 \ \mu\text{m}$. By using such a structure it is possible to further reduce the load on the magnetic disk 32, and so it is possible to more effectively reduce any damage to the magnetic disk 32.

It should be noted that in the above-described embodiment, the part of the edges of the flat surface portions that form part of the first and second air bearing surfaces 20, 22 at the four corners of the slider 16C are all shown as being arc-shaped. However, it is possible to achieve the predetermined effect by forming just the two corners on the leading edge side toward which the magnetic disk 32 advances, shown as radii R1 and R2 in the drawing.

In other words, as described above, the leading edge side is the side toward which the magnetic disk 32 advances and which, as compared to the trailing edge side, is more likely to be the position of contact between the magnetic disk 32 and the magnetic head 10C. Accordingly, even if only this leading edge is given the above described arc shape of predetermined radius it is still possible to reduce any damage to the magnetic disk 32 compared to the conventional art.

Next, a description will be given of a fourth embodiment of the magnetic head according to the present invention, with reference to FIG. 13 and FIG. 14.

Figure 13:
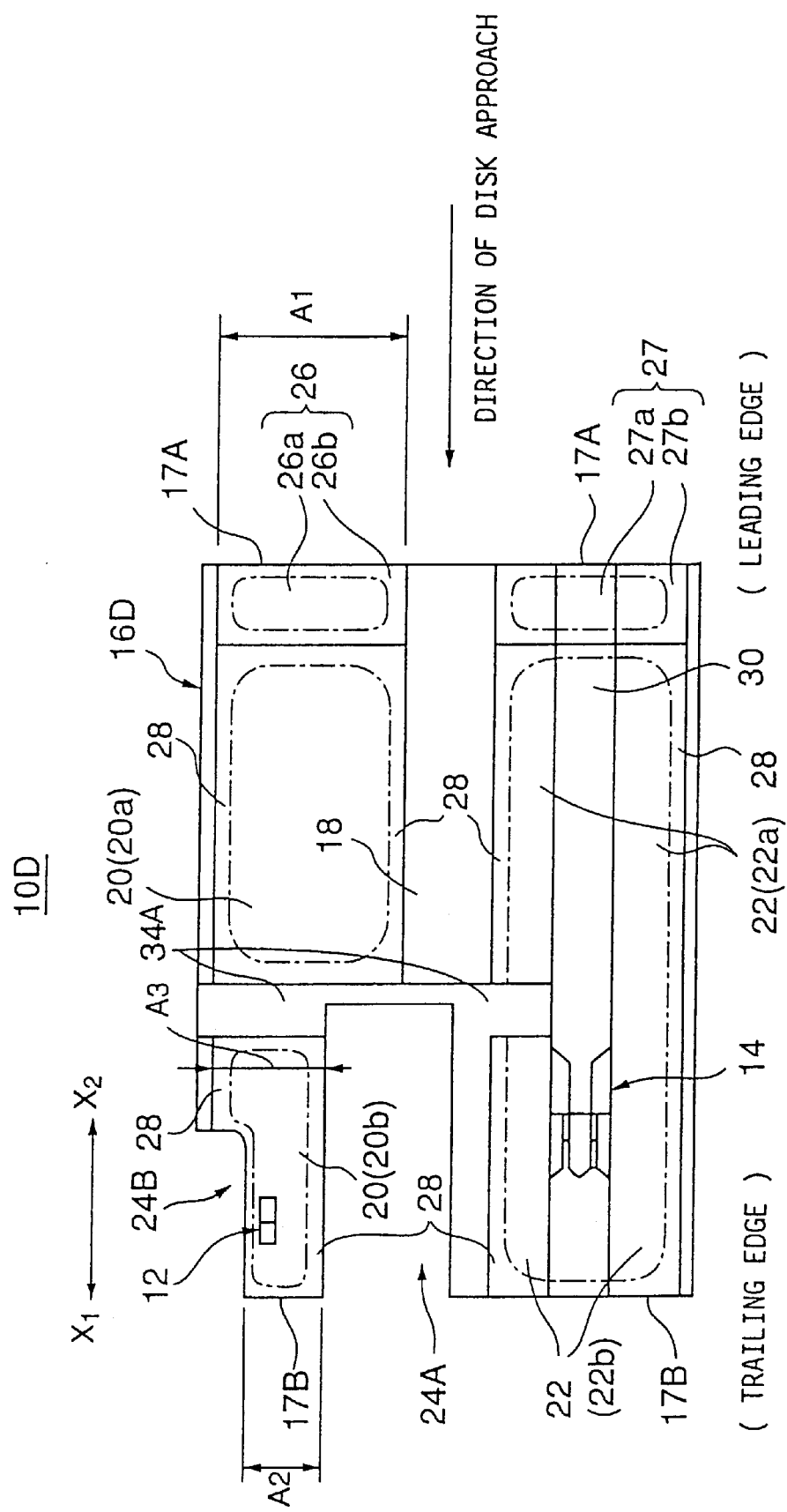
FIG. 13 is a plan view of a fourth embodiment of the magnetic head according to the present invention.
Figure 14:
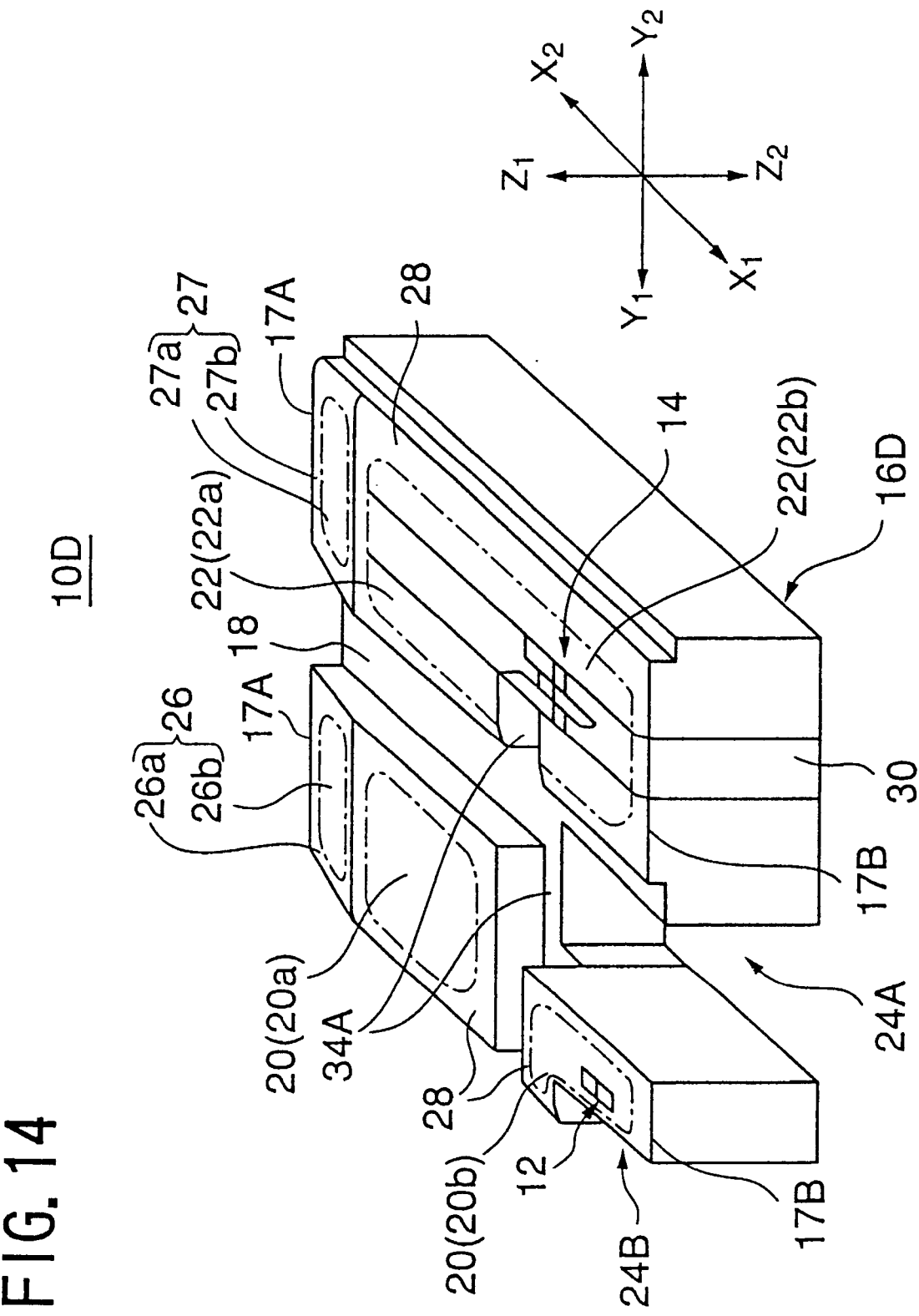
FIG. 14 is a perspective view of a fourth embodiment of the magnetic head according to the present invention.

FIG. 13 is a plan view of a fourth embodiment of a magnetic head 10D according to the present invention. FIG. 14 is a perspective view of a fourth embodiment of a magnetic head 10D according to the present invention. It should be noted that, in FIGS. 13 and 14, those parts identical to the corresponding parts of the magnetic head 10A of the first embodiment shown in FIGS. 6, 7, 8, 9 and 10 are given identical reference numerals and a description thereof omitted.

The fourth embodiment of the magnetic head 10D is characterized in that a second incision 24B is formed on the trailing edge of the slider 16D. Accordingly, the first magnetic head unit 12 is sandwiched between the first incision 24A and the second incision 24B. The second incision 24B, like the first incision 24A, is formed so as to penetrate the slider 16D in a direction indicated in FIG. 14 by arrow Z1-Z2.

Additionally, the magnetic head 10D is formed so that a leading edge side 17A of the first air bearing surface 20 has a width A1, a portion near to the first magnetic head unit 12 at which the second incision 24B is formed, that is, the trailing edge 17B, has a width A2 that is smaller than the width A1, and a portion distant from the first magnetic head unit 12 in a direction indicated in the drawings by arrow X2 at which the second incision 24B is not formed has a width A3 that is larger than the width A2 but smaller than the width A1, that is, A2<A3<A1.

Accordingly, because the magnetic head 10D having the configuration described above has the second incision 24B, the flow of air generated between the magnetic disk 32 and the slider 16D is also vented to the outside of the slider 16D via the second incision 24B as well. As a result, the elevating force is reduced in the area at which the second incision 24B is formed.

Additionally, because the second incision 24B is formed so as to establish the condition A2<A3<A1, the elevating force generated by the flow of air is at its largest at width A1 and at its smallest at width A2. In other words, the elevating force is smallest at the portion of width A2 at which the first magnetic head unit 12 is formed.

As a result, the magnetic disk 32 comes closest to the magnetic head 10D at the position at which the first magnetic head unit 12 is formed, and accordingly, it is possible to obtain stable electromagnetic conversion characteristics. Additionally, it is possible to prevent contact between the recording medium 32 and the magnetic head 10D, that is, it is possible to prevent damage to the magnetic disk 32 due to contact with the magnetic head 10D, because an ideal floating condition, that is, so-called zero penetration, can be achieved.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope of the present invention.

What is claimed is:

1. A magnetic head comprising:
   a first magnetic head unit for recording to and reproducing from a first flexible rotating recording medium;
   a second magnetic head unit for recording to and reproducing from a second flexible rotating recording medium having a coercive force lower than a coercive force of the first flexible rotating recording medium;
   a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;
   an elevating force control slot formed on at least the first air bearing surface so as to extend in a direction substantially perpendicular to the direction from which the first or second flexible rotating recording medium approaches the magnetic head; and
   an incision formed on a trailing edge side of the slider so as to restrict a width of the first air bearing surface and at the same time penetrate in a direction of the height of the slider,
   a distance from a center position of a track of the first magnetic head unit to an edge of the first air bearing surface in the direction from which the first or second flexible rotating recording medium approaches the magnetic head being $Y_H$, a distance from a center position of a track of the first magnetic head unit to an edge of the first air bearing surface perpendicular to the direction from which the first or second flexible rotating recording medium approaches the magnetic head being $X_H$, such that $0.01\ mm \leq Y_H \leq 0.1\ mm$ and $0.01\ mm \leq X_H \leq 0.1\ mm$.

2. The magnetic head as claimed in claim 1, wherein a chamfered portion is configured so that a pitch S of interference fringes recognized using an optical flat is $10\ \mu m \leq S \leq 50\ \mu m$.

3. The magnetic head as claimed in claim 1, wherein:
   a second incision is formed on a trailing edge of the slider, the trailing edge of the slider being an outer side of the first magnetic head unit; and
   a leading edge side of the first air bearing surface having a width A1, a portion near to the first magnetic head unit formed by the second incision having a width A2 smaller than the width A1, a portion distant from the first magnetic head unit not formed by the second incision having a width A3 larger than the width A2 but smaller than the width A1, such that $A2 \leq A3 \leq A1$.

4. A magnetic head comprising:
   a first magnetic head unit for recording to and reproducing from a first flexible rotating recording medium;
   a second magnetic head unit for recording to and reproducing from a second flexible rotating recording medium having a coercive force lower than a coercive force of the first flexible rotating recording medium;
   a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;
   an elevating force control slot formed on at least the first air bearing surface so as to extend in a direction substantially perpendicular to the direction from which the first or second flexible rotating recording medium approaches the magnetic head; and
   an incision formed on a trailing edge side of the slider so as to restrict a width of the first air bearing surface and at the same time penetrate in a direction of the height of the slider,
   a slanting surface formed on a leading edge side of the first and second air bearing surfaces, respectively, a chamfered portion being formed on an outer periphery of a flat surface portion forming the first and second air bearing surfaces as well as on an outer periphery of a flat surface portion forming the slanting surface.

5. The magnetic head as claimed in claim 4, wherein of the four corner portions of the flat surface forming the first and second air bearing surfaces of the slider at least the two corner portions on the leading edge of the slider have an arc shape of which a radius R is greater than or equal to 0.2 mm but less than or equal to 1 mm.

6. The magnetic head as claimed in claim 4, wherein a chamfered portion is configured so that a pitch S of interference fringes recognized using an optical flat is $10\ \mu m \leq S \leq 50\ \mu m$.

7. A magnetic head comprising:
   a first magnetic head unit for recording to and reproducing from a first flexible rotating recording medium;
   a second magnetic head unit for recording to and reproducing from a second flexible rotating recording medium having a coercive force lower than a coercive force of the first flexible rotating recording medium;

a slider supporting the first magnetic head unit, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;

an elevating force control slot formed on at least the first air bearing surface so as to extend in a direction substantially perpendicular to the direction from which the first or second flexible rotating recording medium approaches the magnetic head; and an incision formed on a trailing edge side of the slider so as to restrict a width of the first air bearing surface and at the same time penetrate in a direction of the height of the slider, a slanting surface formed on a leading edge of the first and second air bearing surfaces, respectively, a border portion between the slanting surface and the first and second air bearing surfaces forming a continuous curve.

8. A magnetic head comprising:

at least one magnetic head unit recording to and reproducing from a flexible rotating recording medium;

a slider, supporting the magnetic head unit, and having a central groove separating a first air bearing surface and a second air bearing surface, said slider generating an elevating force from an air flow generated in a space between the first and second air bearing surfaces and the flexible rotating recording medium;

an elevating force control slot formed on at least one of either the first and second air bearing surfaces so as to extend in a direction substantially perpendicular to a direction from which the flexible rotating recording medium approaches the magnetic head; and an incision, provided in a trailing edge side of the slider, and penetrating in a direction of a height of the slider, so as to restrict a width of at least one of the first and second bearing surfaces at the trailing edge side to become smaller than that a leading edge side, a distance $Y_H$ from a track center position of said magnetic head unit to an edge of one of the first and second air bearing surfaces in a direction of travel of the flexible rotating recording medium satisfying a condition $0.01 \text{ mm} \leq Y_H \leq 0.1 \text{ mm}$, and a distance $X_H$ from the track center position of said magnetic head unit to an edge of one of the first and second air bearing surfaces in a direction substantially perpendicular to the direction of travel of the flexible rotating recording medium satisfying a condition $0.01 \text{ mm} \leq X_H \leq 0.1 \text{ mm}$.

* * * * *